(12) United States Patent
Wayne et al.

(10) Patent No.: US 7,737,576 B2
(45) Date of Patent: Jun. 15, 2010

(54) VEHICLE MOUNTED ACCESSORY WITH MULTIPLEXING

(75) Inventors: Edwin A. Wayne, Warren, ME (US); Clarence J. Rand, Rockport, ME (US)

(73) Assignee: Douglas Dynamics, LLC, Milwaukee, WI (US)

( * ) Notice: Subject to any disclaimer, the term of this patent is extended or adjusted under 35 U.S.C. 154(b) by 0 days.

(21) Appl. No.: 12/173,570

(22) Filed: Jul. 15, 2008

(65) Prior Publication Data
US 2008/0266888 A1 Oct. 30, 2008

Related U.S. Application Data

(60) Division of application No. 10/977,133, filed on Oct. 29, 2004, now Pat. No. 7,400,058, which is a continuation-in-part of application No. 10/102,782, filed on Mar. 21, 2002, now abandoned.

(60) Provisional application No. 60/277,713, filed on Mar. 21, 2001.

(51) Int. Cl.
*B60L 1/14* (2006.01)
(52) U.S. Cl. .................................... 307/10.8
(58) Field of Classification Search ................ 307/10.8
See application file for complete search history.

(56) References Cited

U.S. PATENT DOCUMENTS

| | | | |
|---|---|---|---|
| 4,280,062 A | 7/1981 | Miller et al. |
| 4,456,084 A | 6/1984 | Miller |
| 4,531,204 A | 7/1985 | Vanderschel |
| 4,807,468 A | 2/1989 | Galan |
| 4,897,642 A | 1/1990 | DiLullo et al. |
| RE33,835 E | 3/1992 | Kime et al. |
| 5,196,965 A | 3/1993 | Lang et al. |
| 5,212,469 A | 5/1993 | Avellino |
| 5,335,540 A | 8/1994 | Bowler et al. |
| 5,397,924 A | 3/1995 | Gee et al. |
| 5,420,480 A | 5/1995 | Knepel et al. |
| 5,442,332 A | 8/1995 | Hughes |
| 5,488,352 A | 1/1996 | Jasper |
| 5,521,466 A | 5/1996 | Vincent |
| 5,524,368 A | 6/1996 | Struck et al. |
| 5,633,538 A | 5/1997 | Nickerson |
| 5,693,985 A | 12/1997 | Gee et al. |
| 5,739,592 A | 4/1998 | Rigsby et al. |
| 5,780,782 A | 7/1998 | O'Dea |
| 5,825,287 A | 10/1998 | Zarybnicky, Sr. et al. |
| 5,854,517 A | 12/1998 | Hines |
| 5,987,260 A | 11/1999 | Arnold et al. |
| 6,054,779 A | 4/2000 | Zubko |
| 6,078,854 A | 6/2000 | Breed et al. |

(Continued)

*Primary Examiner*—Robert L. Deberadinis
(74) *Attorney, Agent, or Firm*—Wood, Herron & Evans, LLP

(57) ABSTRACT

A control for a vehicle mounted accessory that has an electrically operable device. The accessory is operated by a switch that is mounted on the vehicle remote from the accessory. The switch and the electrically operable device are electrically connected by programmable controllers and a communications bus. The control has the capability of automatically determining the presence of a vehicle DRL mode, and the accessory turn signal lights are automatically illuminated to provide an accessory DRL mode. The control can automatically detect different accessories and reprogram itself to control them. The control provides a secured communications link between it and the accessory to prevent accessory theft.

30 Claims, 9 Drawing Sheets

U.S. PATENT DOCUMENTS

| | | |
|---|---|---|
| 6,138,388 A | 10/2000 | Kost et al. |
| 6,153,975 A * | 11/2000 | Perdec ........................ 315/82 |
| 6,163,985 A | 12/2000 | Chinnery et al. |
| 6,253,470 B1 | 7/2001 | Depies et al. |
| 6,265,829 B1 | 7/2001 | Perdec |

* cited by examiner

VEHICLE MOUNTED ACCESSORY WITH MULTIPLEXING

This application is a divisional application of U.S. Ser. No. 10/977,133 filed Oct. 29, 2004, now U.S. Pat. No. 7,400,058 issued Jul. 15, 2008, which is hereby expressly incorporated herein by reference in its entirety, and which is a continuation-in-part application of U.S. Ser. No. 10/102,782, filed Mar. 21, 2002, now abandoned, which is hereby expressly incorporated herein by reference in its entirety and claims the benefit of Provisional U.S. Ser. No. 60/277,713, filed Mar. 21, 2001, now expired, and is hereby expressly incorporated herein by reference in its entirety.

FIELD OF THE INVENTION

The present invention generally relates to vehicle mounted accessories and more particularly, to a multiplexing communications link between a vehicle and an accessory mounted thereon.

BACKGROUND OF THE INVENTION

The mounting of an accessory, for example, a plow or material spreader, on a vehicle requires that accessory controls be placed in the vehicle at a location accessible to a vehicle operator, who is normally seated in a driver's seat. Upon the vehicle operator using the accessory switches, electrical signals must be transmitted from the switches to various devices on the plow or material spreader. Normally, the transfer of those signals is accomplished by running individual wires from the switches to the various devices on the plow and material spreader. Further, each of those wires must pass through one or more electrical connectors that are used to connect and disconnect the plow or material spreader from the vehicle. The relatively large number of wires used in such connectors makes the connectors relatively expensive to manufacture and somewhat awkward and difficult for a user to connect and disconnect. In addition, such electrical connectors are normally exposed to adverse weather conditions and moisture; and over time, electrical contacts within the connectors oxidize, corrode, etc. Such oxidation, etc., is detrimental to maintaining high quality electrical connections across the electrical connectors. Further, such oxidation, etc., may cause the contacts between the two coupling members of the connectors to bind together, thereby making it difficult to separate the two coupling members of the connectors without causing damage.

In order to reduce the cost and labor associated with adding large, multiconductor accessory wiring cables to a vehicle to handle control signals for an accessory, it is known to use existing vehicle wiring as a communications bus over which frequency modulated control signals for the accessories are multiplexed. While such a system does eliminate the costs associated with the manufacture and installation of the cables, other potential problems are introduced. First, there are the costs of the electronic circuits to support the encoding/decoding and multiplexing of the signals over existing vehicle wiring. Second, the existing vehicle wires are chosen for their intended use, that is, to conduct power throughout the vehicle, and are not ideal conductors for accessory control signals. Third, there is a question whether the system as a whole is sufficiently immune from outside signal interference. Fourth, there is a potential of interfering with the operation of existing or future vehicle electrical devises that are powered by, or controlled over, the vehicle power lines.

Therefore, there is a need for a system for transferring accessory control signals between a vehicle and vehicle mounted accessories using fewer connections while isolating the accessory electrically, from the vehicle as much as possible.

Accessories such as a plow that are mounted on a front end of a vehicle often obscure a daytime running light ("DRL") on the vehicle. In such a situation, it is desirable to provide a DRL feature on the plow. However, in view of the many different ways that manufacturers implement a DRL feature, it is very difficult to practically integrate a DRL feature on an after-market product such as the plow. Therefore, there is a need to provide an accessory product that automatically implements a DRL feature if such is used on a vehicle.

Different plows having different shapes and controls to effect different motions can be mounted on a vehicle. Thus, each plow has a unique control program that requires either a physically separate control, which is expensive, or the reprogramming of a generic control, which is time consuming for the user. Therefore, there is a need to provide a plow control that is able to automatically identify a particular type of plow that is attached to the vehicle and then, automatically reprogram itself to operate the identified plow.

When not in use, unattached plows are often left at locations where they are accessible to others. Therefore, anyone having a plow control of a particular manufacturer installed on a vehicle can approach an unattached plow, attach it and drive away. However, if the communications between a particular vehicle and a particular plow are secured, for example, with a security code, then an unauthorized person cannot operate a plow with a different, unauthorized plow control. Thus, there is a need for a plow control that utilizes security measures to help deter plow thefts.

SUMMARY OF INVENTION

The present invention provides a control system for a vehicle accessory that is easy to install, flexible in its implementation and reliable in operation. The control system of the present invention has the advantage of automatically simulating on the plow the vehicle lighting modes selected by a user including a DRL mode. The control system of the present invention is particularly useful with a plow and provides secured communications to deter theft of a plow. Further, the control system of the present invention is able to automatically identify a type of plow being used and automatically program itself to be able to properly control the plow.

In accordance with the principles of the present invention and the described embodiments, an apparatus is provided for controlling a plow or other accessory having an electrically operable device for moving the plow after the plow is mounted on a vehicle. The apparatus has a plow control with a switch mounted on the vehicle remote from the plow. A first controller is located in the proximity of the switch and is connected to the switch for receiving a command signal switch therefrom. A second controller is mounted on the plow and electrically connected to the electrically operable device. First and second dedicated communications buses are connected to the respective first and second controllers, and first and second connectors are connected to the respective first and second communications buses. The second connector is connected to the first connector upon the plow being mounted on the vehicle, thereby connecting the first and second communications buses to form a communications bus. The first controller provides the command signal to the second controller via the dedicated communications bus, and the second controller operates the electrically operable device on the plow in response to receiving the command signal.

In one aspect of this invention, the electrically operable device can be a solenoid, a hydraulic valve, etc. In another aspect of this invention, a third controller operates either vehicle lights or accessory lights with the vehicle light switch.

In another embodiment, an apparatus is provided for controlling an accessory having a light other than an accessory headlight, which is attachable to a vehicle having a vehicle light operable in a DRL mode. The apparatus has a controller adapted to be mounted on the vehicle, and the controller illuminates the light other than the accessory headlight in response to detecting a supply voltage operable to illuminate the vehicle light in a DRL mode.

In a further embodiment, an apparatus is provided for detecting a presence of an accessory mounted on a vehicle, the accessory having an electrically operable device unique to the accessory. The apparatus has a first controller mounted on the vehicle, and a second controller mounted with the accessory and electrically connectable to the first controller upon the accessory being mounted on the vehicle. The second controller is connected to the electrically operable device and senses electrical continuity within the electrically operable device. The second controller then communicates to the first controller a presence of the electrically operable device unique to the accessory. In one aspect of this invention, the first controller automatically programs itself to operate the accessory in response to detecting the presence of the electrically operable device.

In a still further embodiment, an apparatus is provided for securing communications between a vehicle and an accessory mountable on the vehicle. The apparatus has a first controller adapted to be mounted on the vehicle, and a user-operable interface controller electrically connectable to the first controller and being operable to provide a security code to the first controller. A second controller is mounted with the accessory and is connectable to the first controller upon the accessory being mounted on the vehicle. The second controller is connected to the electrically operable device only in response to the second controller receiving the security code from the first controller.

Various additional advantages, objects and features of the invention will become more readily apparent to those of ordinary skill in the art upon consideration of the following detailed description of the presently preferred embodiments taken in conjunction with the accompanying drawings.

DETAILED DESCRIPTION OF THE INVENTION

Figure 1:
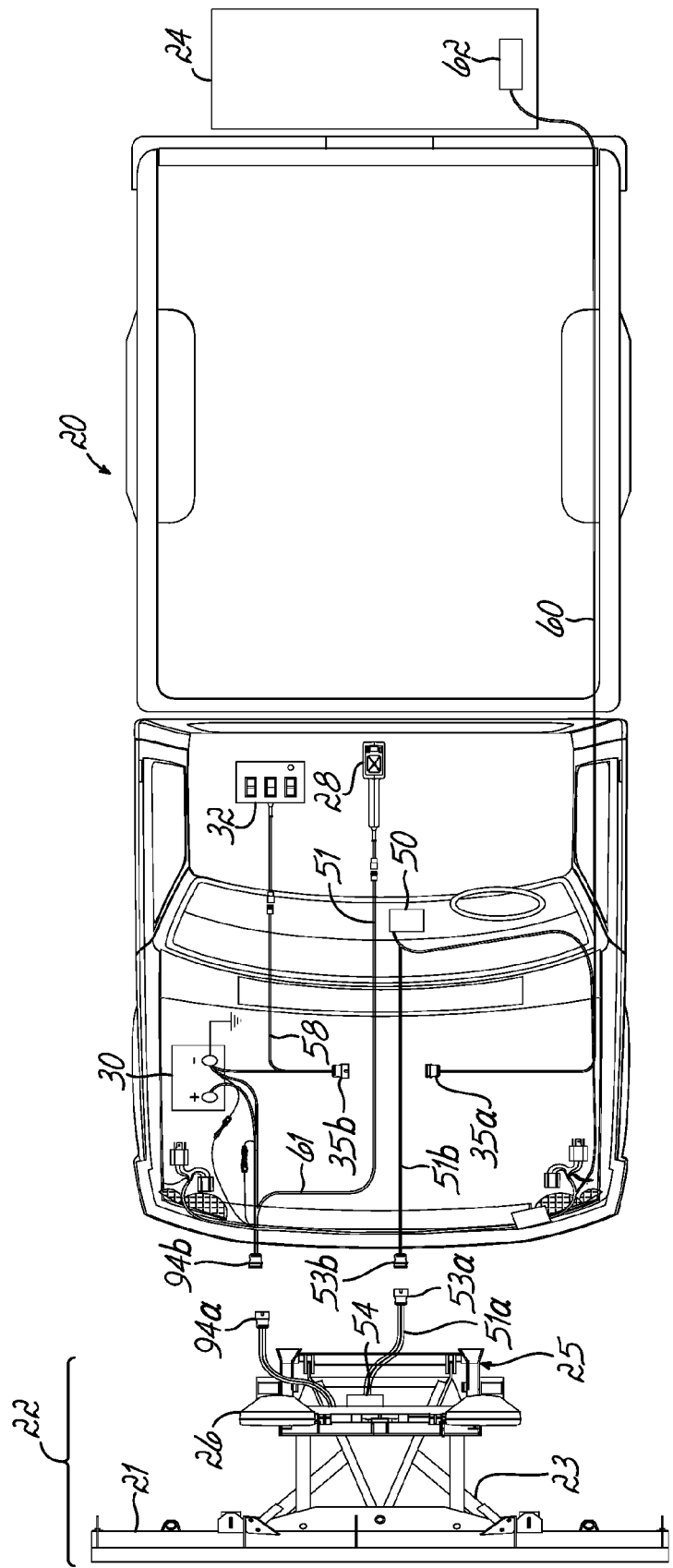
FIG. 1 is an overall schematic diagram of a vehicle with accessories and a communications system in accordance with the principles of the present invention.

Referring to FIG. 1, during the winter months, the utility of a vehicle 20, for example, a truck, can be enhanced by mounting various accessories thereto. For example, during inclement weather, a plow 22 is often mounted to a front end of the vehicle 20 and a spreader 24 is often mounted to the rear of the vehicle 20. As will be appreciated, the plow 22 includes a blade 21, an A-frame 23 and headgear 25 on which plow lights 26 are mounted; and the plow 22 can also be mounted to a bottom portion of the vehicle or the rear end. The spreader 24 spreads a material, for example, salt, sand, etc., that is intended to improve vehicle traction on the road. It is also necessary that devices, for example, plow lights 26 and other electromechanical devices on the plow 22, be electrically connected to a plow control 28 and a vehicle power source such as a battery 30. Those connections are implemented using cables 51, 52, 61 and connectors 53, 94. Similarly, it is necessary for the spreader 24 to be electrically connected to its control 32 as well as the battery 30. Normally, such electrical connections are accomplished using cables 58, 60 and a connector 35. The cables 58, 60 are normally part of a spreader wiring harness 33; and the cables 51, 61, 52, are normally part of a plow wiring harness 34.

Figure 2A:
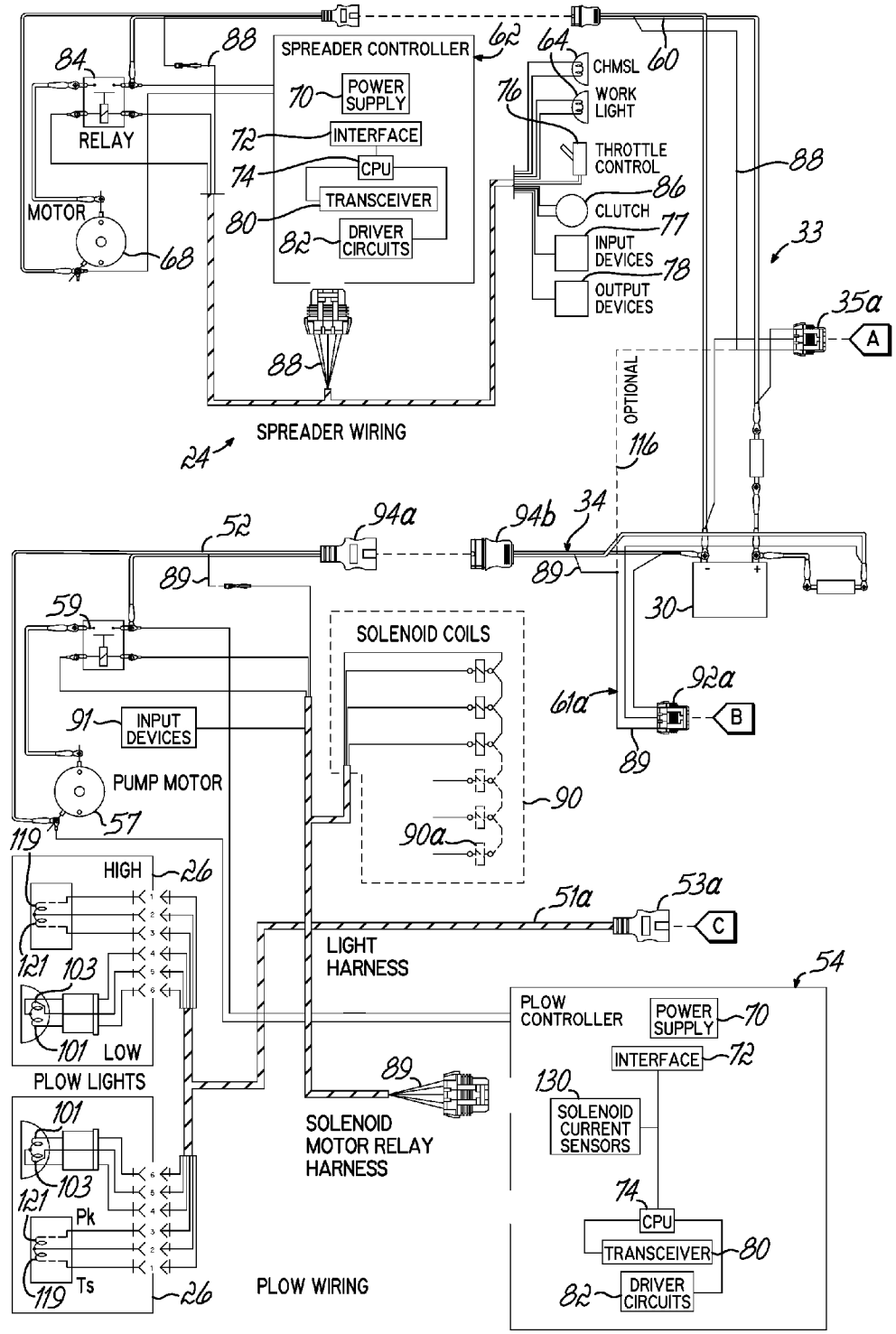
FIGS. 2A and 2B are detailed schematic diagrams of a vehicle accessory control system in accordance with the principles of the present invention.
Figure 2B:
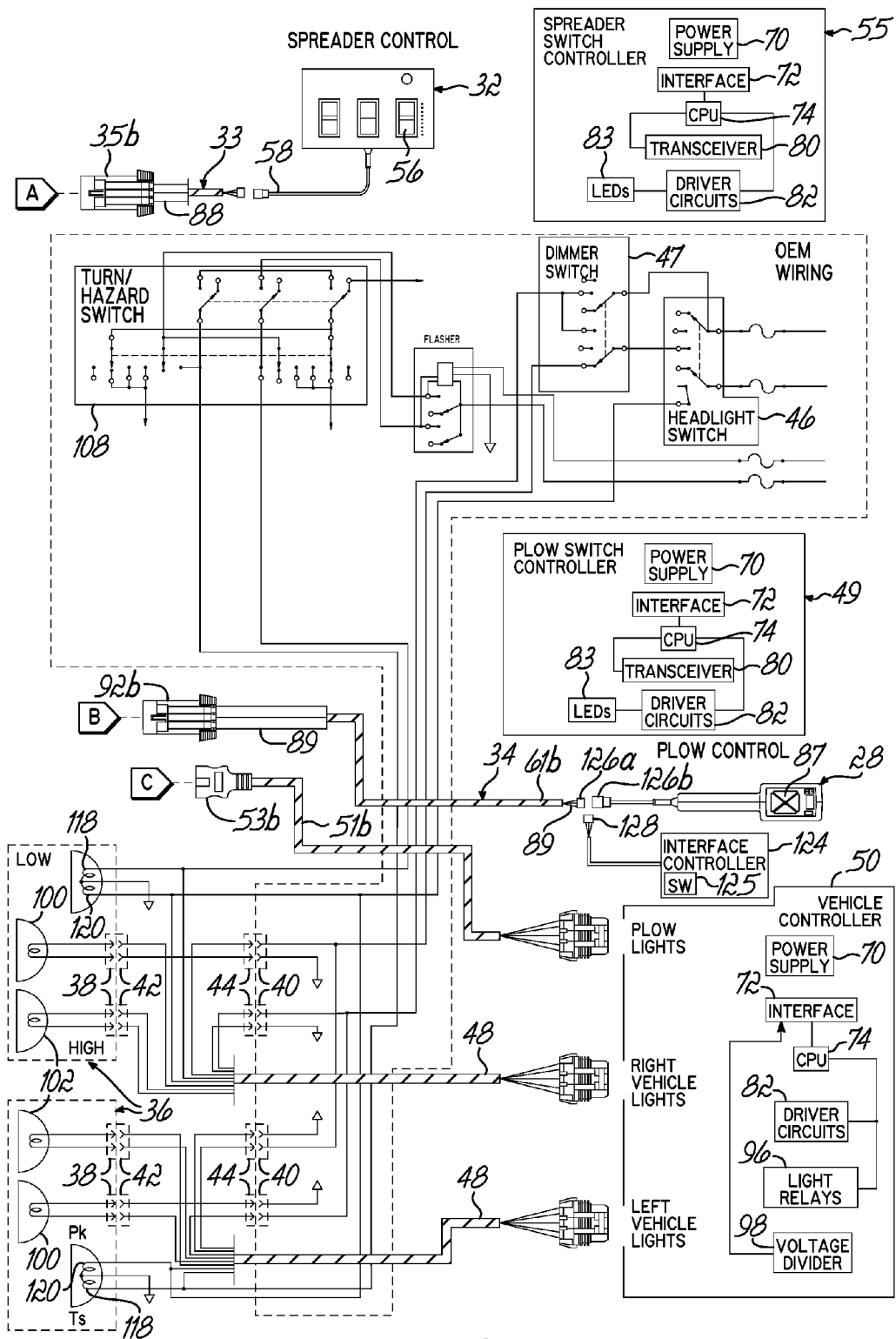

Referring to FIGS. 2A, 2B, the plow wire harness 34 is designed to minimize the work required for installation of the plow 22 and its associated control system. For example, vehicle lights 36 have connectors 38 that normally plug into mating connectors 40 supplying power to the headlights. To install the plow lighting system, the connectors 38, 40 are separated and plugged into respective plow cable connectors 42, 44. Thus, power signals provided from headlight, dimmer and turn/hazard switches 46, 47, 108 are diverted through connectors 44 and cables 48 and into a vehicle controller 50. The vehicle controller determines whether the plow 22 is mounted on the vehicle 20 and if not, provides power signals through connectors 42 to illuminate the vehicle lights 36 in a manner corresponding to the states of the switches 46, 47, 108 as selected by the vehicle operator. If the plow 22 is mounted on the vehicle 20, the vehicle controller 50 turns Off the vehicle headlights 100, 102 and provides light voltages over light cable 51a, 51b via connector 53 to the plow headlights 101, 103 in accordance with the selection of the switches 46, 47. In addition, based on a user's operation of various input switches 87, a plow switch controller 49 within the plow control 28 provides plow command signals over plow cables 61, 52 via connectors 92, 94 to the plow controller 54. Such command signals relate to the operation of various devices on the plow 22, for example, hydraulic valves (not shown) and a pump motor 57 that supplies hydraulic power used to move the plow to different commanded positions in a known manner.

The spreader control 32 contains a spreader switch controller 55 that is responsive to input devices 56, for example, user operable switches, on the spreader control 32 and provides, over cables 58, 60 via connector 35, command signals to a spreader controller 62. The spreader controller then, in turn, operates lights 64, motors 68 and other devices in accordance with the command signals provided by the spreader switches 56.

Each of the controllers 49, 54, 55 and 62 has a programmable CPU 74, is substantially similar in structure, and operates in generally the same way. Considering, for example, the spreader switch controller 55 and spreader controller 62, each has a power supply 70 that generally provides power to devices on the respective controllers 55, 62. Interfaces 72 provide a known function of interfacing signals from input devices to CPU's 74 within the controllers 55, 62. Thus, the interface 72 within the spreader controller 62 provides signals from input devices 77 located on the spreader 24, for example, sensors/transducers providing input signals relating to ground speed, material level, application rate, spinner speed, fault conditions, ambient road surface temperature, etc. The CPUs 74 within the controllers 55, 62 provide outputs to transceivers 80 and driver circuits 82. Within the spreader controller 62, the driver circuits 82 provide output signals to various output devices on the spreader 24, for example, lights 64, a throttle control 76, clutch control 86 and other output devices 78, for example, relays, fault indicators, etc.

The vehicle controller 50 is similar in structure, however, it does not utilize a transceiver. The vehicle controller 50 passes desired light voltages to the vehicle lights via light relays 96. Normally, there is a set of relay contacts for every light filament in the vehicle lights 36 as well as every filament in the plow lights 26. With respect to the headlights, there is a low beam light relay with normally-closed contacts connected to the vehicle low beam 100 and normally-open contacts connected to the plow low beam 101. A high beam light relay is connected in the same way to the vehicle and plow high beams 102, 103, respectively. Thus, when the plow is not mounted on the vehicle, the vehicle lights 100, 102, 118, 120 receive voltages from the various light switches 46, 47, 108. Upon the plow being mounted on the vehicle, the vehicle controller 50 senses the states of the vehicle light switches 46, 47, 108 and operates light relays 96 to provides plow light voltages over individual wires in light harness 51 corresponding to the sensed switch states. The vehicle module 50 also has a power supply 70 that generally provides power to devices on the controller 50, and an interface 72 provides a known function of passing the switch states to CPU 74.

Referring to the spreader switch controller 55, the interface 72 is electrically connected to spreader switches 56 that are operated by the user to command the operation of the spreader and other spreader devices. The driver circuits 82 within the spreader switch controller 55 are normally used to illuminate indicators and/or other alarms relating to the operation of the spreader 24.

The transceivers 80 within the controllers 55, 62 are in electrical communication over a dedicated communications bus 88 extending between the controllers 55, 56 as part of cables 58, 60. Thus, the dedicated communications bus 88 can be either a single wire bus or a two wire bus utilizing any type of multiplexing architecture, for example, RS485. The communications bus 88 terminates into transceivers 80 and permits the spreader controller 62 to transmit the outputs from input devices 77 to the spreader switch controller 55. The CPU 74 of the spreader switch controller 55 also scans the outputs of the spreader control switches 56. Based on the outputs from the input switches 56 and the input devices 77, the CPU 74 of the spreader switch controller 55 then determines the desired states of the spreader output devices 64, 76, 78, 84, 86. Again, using the communications bus 88 and the transceivers 80, the spreader switch controller transmits those desired states to the spreader controller 62. The CPU 74 within the spreader controller 62 then changes the states of the drive circuits 82 so that output devices on the spreader 24 are operated in accordance with their desired states as determined by the CPU 74 within the spreader switch controller 55.

Upon installation of the plow 22, the plow control 28 is placed at a location convenient to the user, for example, the cab of the vehicle 20. The vehicle controller 50 is mounted at a convenient location on the vehicle, for example, under the dash in the cab or in the engine compartment. The cables 48 are routed from the vehicle controller 50 to the location of the vehicle lights, and connectors 42, 44 are connected to connectors 38, 40, respectively. The cable 51*b* is connected to the vehicle controller 50, routed through the engine compartment and is connected to one end of plow light cable 51*a* via connectors 53*a*, 53*b*. An opposite end of plow light cable 51*a* is connected to the plow lights 26. Upon installation of the plow control 28 in the vehicle 20, the connectors 92*a*, 92*b* are joined and remain connected, thereby connecting the plow control cables 61*a*, 61*b*. Connecting the connectors 92 supplies power to the plow control 28 and controller 49 and routes a communications bus 89 between the connector 94*b* and the controller 49. The communications bus 89 can be a single wire bus or a two wire bus, for example, a twisted pair of wires. Cable 52 provides a continuation of the communications bus 89 between the connector 94*a* and the plow controller 54.

After the plow 22 has been initially installed, upon mounting and dismounting the plow 22 from the front of the vehicle 20, all electrical connections to the plow are made and broken by simply connecting and disconnecting the connectors 94*a*, 94*b* and 53*a*, 53*b*. Joining connectors 53*a*, 53*b* provides power to the plow lights, and connecting connectors 94*a*, 94*b* provides power to the plow controller 54. The plow lights 26, plow controller 54, pump motor 57, solenoids 90 and related electrical components are physically mounted on the plow 22 (FIG. 1). In addition, connecting connectors 94*a*, 94*b* forms the communications bus 89 between the plow switch controller 49 and the plow controller 54. Thus, the plow switch controller 49 and plow controller 54 are in electrical communications via a communications bus extending through cables 61, 52 and connector 94 between the transceivers 80 in each of the controllers 49, 54.

Plow control switches 87 allow the user to provide commands to raise, lower, rotate, extend and retract, that is, position, the plow in a known manner. The functions of the input switches 87 will vary depending on whether the plow 22 has a straight blade or a multi-position blade. The signals from the input switches 87 are provided to the interface 72 within the plow switch controller 49, and the CPU 74 of the plow switch controller 49 reads and stores the input signals from the switches 87. If appropriate, the CPU 74 of the plow switch controller 49 provides output signals to driver circuits 82 to illuminate sensory perceptible indicators, for example, LEDs 83 on the plow control 28, thereby indicating the operating status of the plow to the user. In addition, the CPU 74 within the plow switch controller 49 uses the communications bus 89 and connected transceivers 80 to transfer desired output states of the solenoids 90 and pump motor 57 via relay 59 to the plow switch controller 54.

The CPU 74 within the plow controller 54 receives the desired states of the output devices and activates its driver circuits 82 accordingly, thereby causing the operating states of the solenoids 90, pump motor 57 and relay 59 to correspond to the desired states determined by the plow switch controller 49. The interface 72 of the plow controller 54 is connected to input devices 91, for example, pressure sensors or transducers, such as a plow load sensor/transducer, position sensors or transducers, etc., that monitor or are activated by the operation of the plow 22. The interface 72 provides input signals from the input devices 91 to the CPU 74 that, in turn, reads and stores the outputs of the input devices 91.

In use, when the plow 22 is not attached to the vehicle 20 and the connectors 53a, 53b and 94a, 94b are separated, the vehicle controller 50 has no power applied to it. The light relays 96 have respective default states that pass supply voltages from the light switches 46, 47, 108 to the vehicle lights 36, and thus, the user selects the desired operating states of the vehicle headlights 101, 103, turn signal/hazard lights 119 and parking lights 121 by using switches 46, 47, 108.

Figure 3:
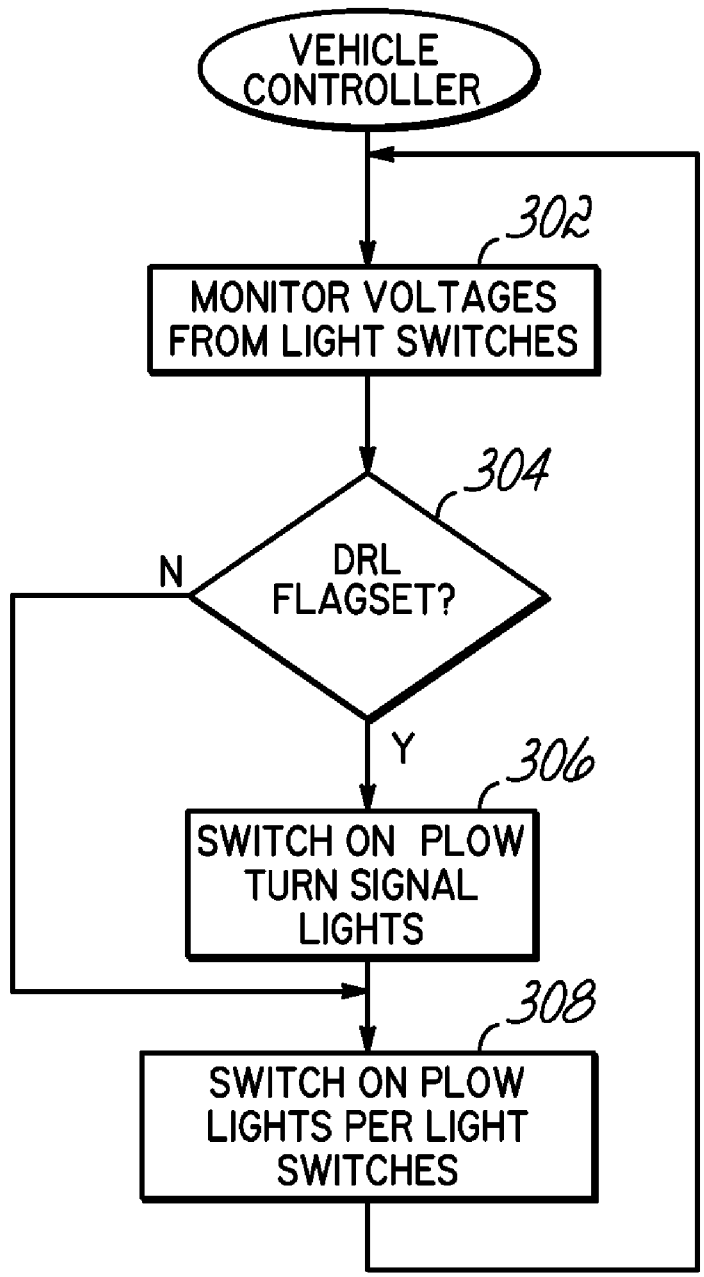
FIG. 3 is a flowchart illustrating an operation of a vehicle controller within the communications system of FIG. 1.

Upon attaching the plow 22 and joining connectors 53a, 53b and 94a, 94b, power is applied to a relay (not shown) that, in turn, supplies power to the vehicle controller 50. Referring to FIG. 3, the CPU 74 within the vehicle controller 50 begins, at 302, to monitor voltages from the light switches 46, 47, 108. By interposing the connectors 42, 44 between the existing vehicle connectors 38, 40, the CPU 74 of the vehicle controller 50 is able to monitor the voltages supplied to the vehicle lights 36. Thus, the vehicle controller 50 is able to automatically identify which of the vehicle lights 36 are being switched on and off by the user. By monitoring light switch voltages, the vehicle controller 50 is also able to automatically detect whether the vehicle lights 36 are operating in a DRL mode. To detect the DRL mode, the vehicle controller 50 utilizes voltage dividers 98 that measure supply voltages for the vehicle low beams 101 and high beams 103. Those voltages are provided to an A/D converter input of the CPU 74 of the vehicle controller 50.

Figure 4:
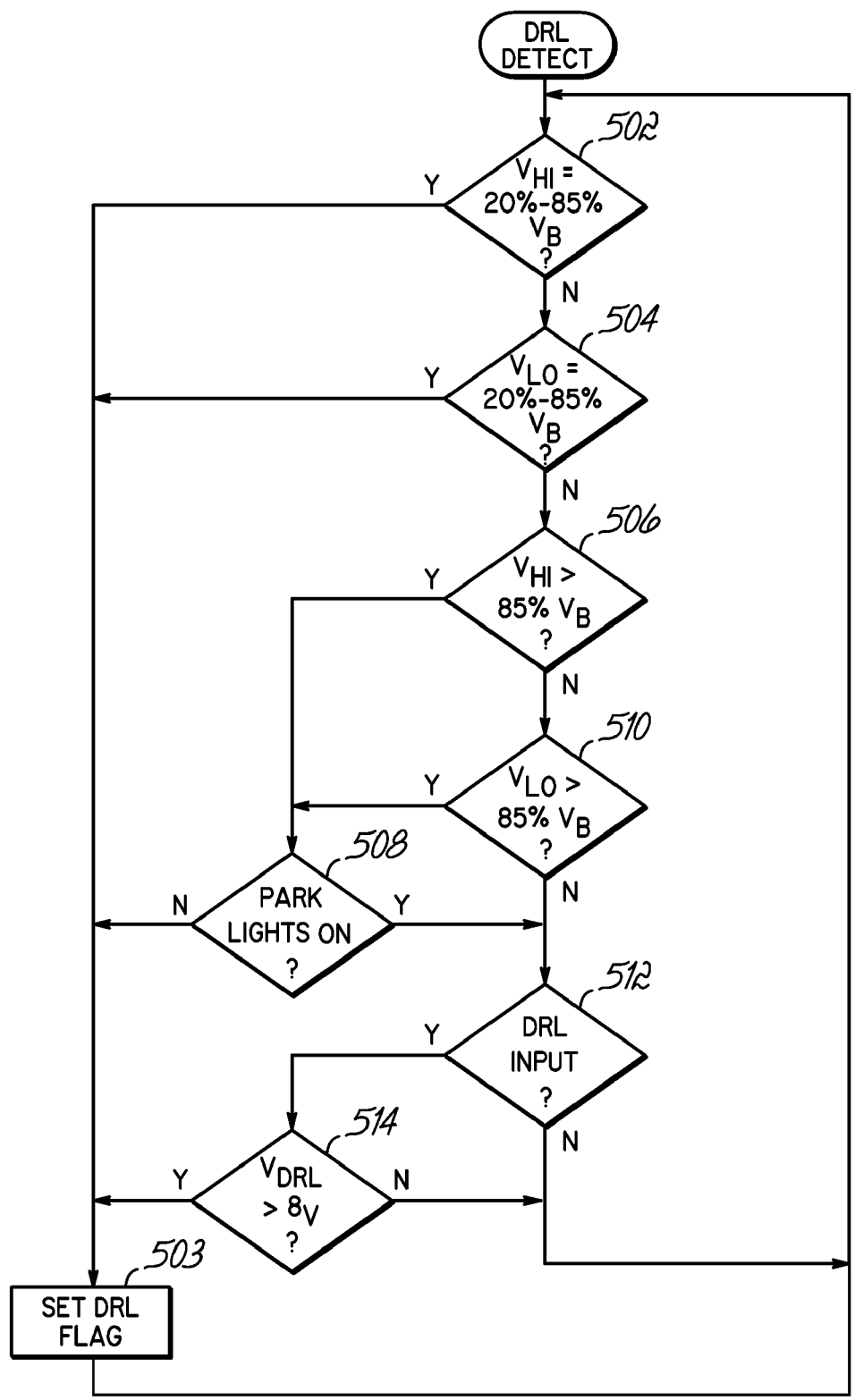
FIG. 4 is a flowchart illustrating a process by which the vehicle controller detects an operation of a DRL mode on the vehicle.

Referring to FIG. 4, the vehicle controller CPU, at 502, determines whether the high beam supply voltage is in a range of from about 20%-85% of the magnitude of the battery voltage. If it is, a DRL flag is set at 503. If not, the CPU then, at 504, determines whether the low beam supply voltage is in a range of from about 20%-85% of the battery voltage. If so, the DRL flag is again set. If not, the CPU then, at 506, determines whether the high beam supply voltage exceeds about 85% of the battery voltage. If so, a determination is then made, at 508, whether the parking lights are on. If the parking lights are off, the DRL flag is set. If the high beam supply voltage does not exceed about 85% of the battery voltage, the CPU then, at 510, determines whether the low beam supply voltage exceeds about 85% of the battery voltage. Again, if so, and if the parking lights are not on, the DRL flag is set. The CPU then, at 512, determines whether a signal exists on a DRL input to the vehicle controller 50. Some vehicle lighting systems have a separate signal line for the DRL lighting; and if a signal exists on that line, the CPU then, at 514, determines whether the voltage on the DRL input is greater than about 8 volts. If so, the DRL flag is set at 503.

Referring back to FIG. 3, if the CPU 74 within the vehicle controller detects, at 304, that a DRL flag is set, the CPU 74 in the vehicle controller 50 proceeds, at 306, to operate light relays connected to the plow turn signal lights 118 without interrupting the DRL operation of the vehicle lights 36. Thus, the plow turn signal lights 118 provide a DRL operation for the plow. The CPU 74 within the vehicle controller 50 also, at 308, switches on the other plow lights in accordance with the states of the switches 46, 47, 108. More specifically, if the headlight switch 46 is closed, the vehicle controller 50 operates a light relay 96 having its contacts connected to the respective vehicle and plow low beam lights 100, 101. Operating that relay opens its normally-closed contacts, thereby turning the vehicle low beam lights 100 Off and closes its normally-open contacts, thereby applying the voltage from the headlight switch 46 to the plow low beam light 101. The vehicle controller 50 similarly operates the respective vehicle and plow high beam lights 102, 103 in response to the operation of the dimmer switch 47. In response to switch voltages turning On the vehicle park lights 121 or turn signal lights 119, the vehicle controller CPU 74 leaves those vehicle lights On but operates light relays 96 that are connected via cable 51 to the plow park lights 120 or plow turning signal lights 118, thereby also turning those plow lights On.

Figure 5:
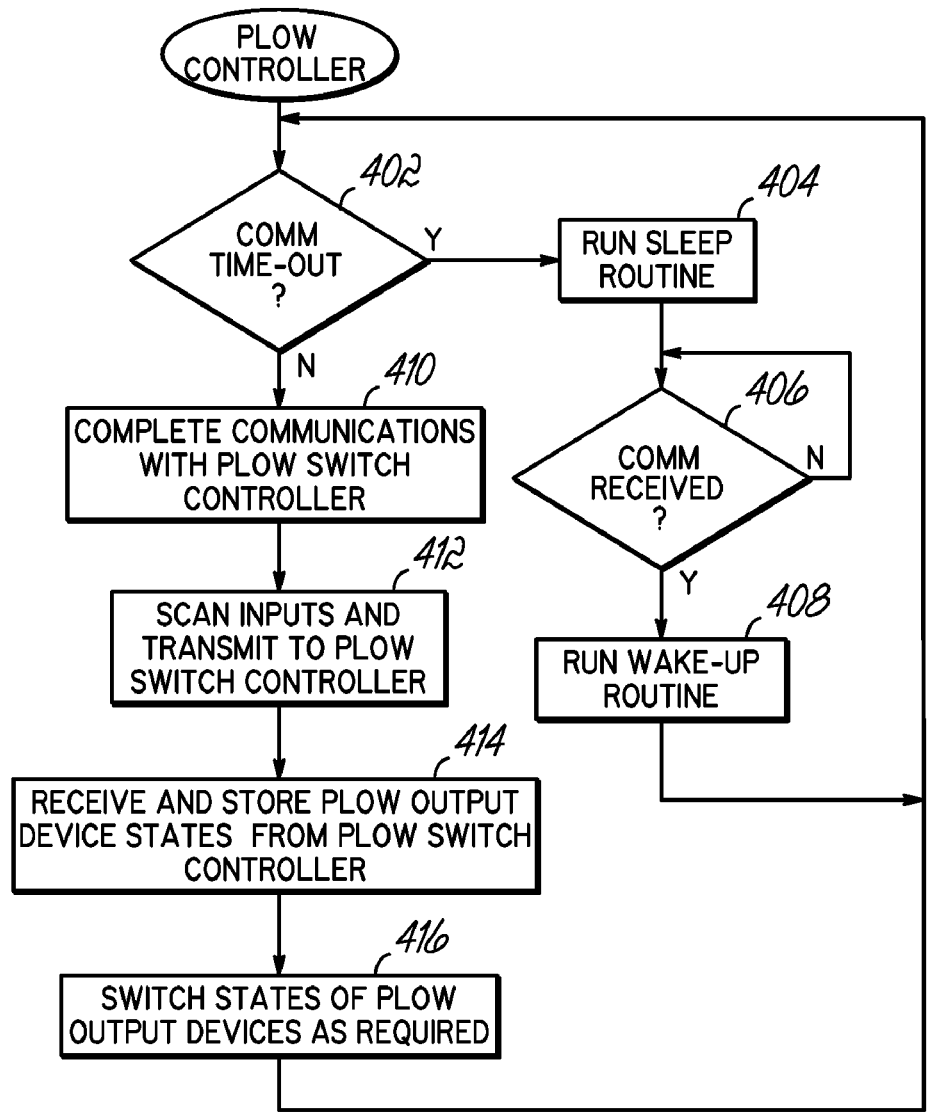
FIG. 5 is a flowchart illustrating an operation of a plow controller within the communications system of FIG. 1.

FIG. 5 illustrates the operation of the plow controller 54 in executing the user commanded plow functions. First, at 402, the CPU 74 in the plow controller 54 determines whether there has been a communication timeout. Each time the plow controller 54 receives a communication from either the vehicle controller 50 or the plow switch controller 49, a communication timer is reset and started. If the plow controller 54 does not receive any communications from either the vehicle controller 50 or the plow switch controller 49 for a predetermined time period, for example, 20 minutes, the communications timer times out and the CPU 74, at 404, executes a sleep routine. In essence, the sleep routine is a minimum power operating routine for the plow controller 54. If, at any time, the CPU 74 within the plow controller 54 detects, at 406, a communication from either the plow switch controller 49 or the vehicle controller 50, the CPU 74 then executes a wake up routine at 408. The wake up routine places the plow controller 54 in its normal operating state. If a communications timeout is not detected, at 402, the CPU 74 within the plow controller 54 then, at 410, completes and confirms communications with the plow switch controller 49 via the transceivers 80 and communications bus 89. Next, at 412, the CPU 74 of the plow controller 54 scans the inputs on the interface 72 that represent the outputs from the input devices 91 on the plow 22. Input devices 91 may include but are not limited to a plow load sensor or transducer, a pressure sensor or transducer, a position sensor or transducer, a current sensor or transducer, etc. The outputs of the input devices are stored within the plow controller 54 and transferred to the plow switch controller 49 via the transceivers 80 and communications bus 89.

Figure 6A:
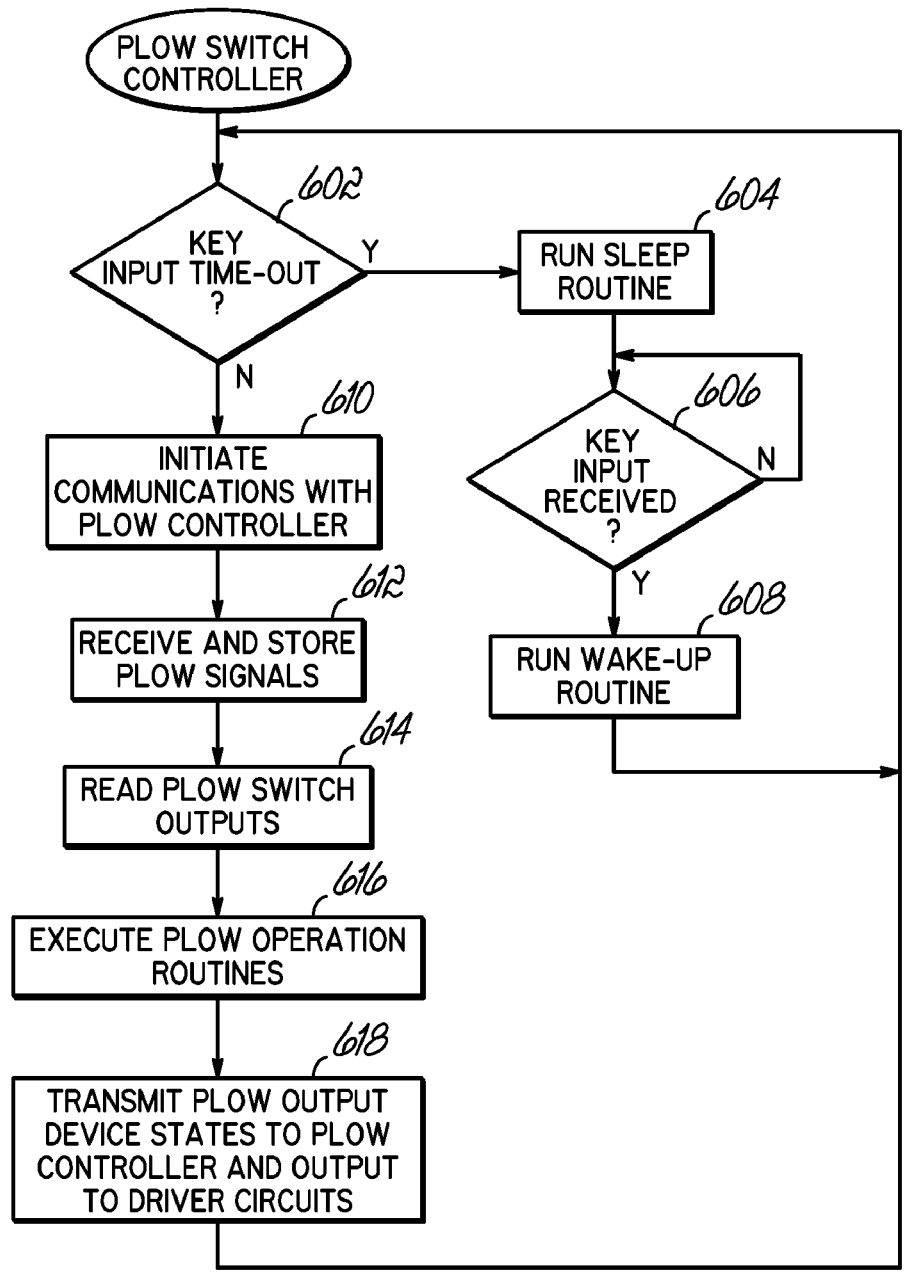
FIG. 6A is a flowchart illustrating an operation of a plow switch controller within the communications system of FIG. 1.

Referring to FIG. 6A, the plow switch controller 49 has a low power sleep routine based on a key input timeout. In other words, if the CPU 74 within the plow switch controller 49 fails to detect, at 602, an operation of one of the input switches 87 for a predetermined period of time, for example, 20 minutes, a sleep routine, at 604, is executed. Upon detecting the next operation of any of the input switches 87, at 606, a wake up routine is run, at 608. Thereafter, the CPU 74 within the plow switch controller 49 initiates, at 610, communications with the plow controller 54.

If communications are established, the CPU 74 of the plow switch controller 49 receives and stores, at 612, the outputs from the plow input devices 91, error signals, if any, and other device states transmitted by the plow controller 54. The CPU 74 of the plow switch controller 49 then reads, at 614, the current states of the plow switches 87 representing the desired user-commanded operation of the plow. Thereafter, the CPU 74 of the plow switch controller 49 executes, at 616, one or more plow operation routines to determine the desired states of the plow output devices that conform to the user commands and existing conditions on the plow as determined by the input devices 91. The CPU 74 of the plow switch controller 49 then proceeds, at 618, to transmit the desired states of the plow output devices to the plow controller 54 over the communications bus 89. During the execution of the plow operation routines, at 616, the plow switch controller CPU also determines whether output devices, for example, sensory perceptible indicators such as LEDs 83, associated with the plow control 28 should be turned on or turned off. The operation of the LEDs 83 normally results from either the user operating the switches 87 or the plow controller 54 transmitting an error signal to the plow switch controller 49. In either event, within the plow switch controller 49, the CPU 74 activates the driver circuits 82 to turn on or off the LEDs 83. The CPU 74 of the plow switch controller 49 then continuously iterates the operation of FIG. 6A.

Referring back to FIG. 5, CPU 74 within the plow controller 54 receives and stores, at 414, the desired states of the plow output devices from the plow switch controller 49. Thereafter, at 416, the CPU 74 of the plow controller 54 switches the states of the driver circuits 82 so that the plow lights 26 and other plow output devices 57, 90, etc., are operated in accordance with their desired commanded states.

The above described control system further includes the capability of providing a secure communication link between the plow switch controller 49 and the plow controller 54. Communications between controllers on the vehicle 20 and the plow 22 can be secured using one or more known techniques and can be implemented in software or hardware. For example, security codes can be imbedded in the communications software that is either accessible or inaccessible to the user. Alternatively, user accessible switches can be used to set passwords into the system.

In one embodiment, the security system can be enabled or disabled by a user operating plow control switches 87 that are electrically connected to the plow switch controller 49. Upon the security system being enabled, the plow switch controller 49 generates a random binary security code that is stored in the plow switch controller 49. The plow switch controller 49 then transmits the security code to the plow controller as described with respect to step 610 of FIG. 6A. The plow controller 54 receives and stores the security code as described with respect to step 414 of FIG. 5. The next time that the plow 22 is electrically connected to the vehicle 20 via the connectors 94a, 94b, the plow switch controller 49 transmits its security code to the plow controller; and the plow controller 54 answers or completes communications with the plow switch controller 49 per step 410 of FIG. 5. If the security code received by the plow controller 54 matches its stored security code, the plow controller 54 operates normally. However, if the security code received from the plow switch controller does not match the security code stored in the plow controller 54, the plow controller 54 disables, that is, does not provide output signals to, the solenoids 90 that operate the hydraulic system; and the user is unable to move or otherwise operate the plow 22. Thus, the use of a security code that is automatically generated by, and embedded in, the software is effective to limit the unauthorized use of the plow 22. The security code remains active until the security system is disabled by the user; and when the security system is again enabled, a new security code is generated.

However, there are other situations where it is desirable that the user have control over the generation of the security code. For example, the user may have several vehicles that should be connectable to a particular plow. Therefore, each of those vehicles and the plow should have the same security code. In this embodiment, an interface controller 124 (FIG. 2B) having a power supply, CPU, interface and transceiver similar to the other controllers, also has, as inputs, switches 125 that are used to permit the user to select a particular numerical security code. To install the interface controller 124, connectors 126a, 126b between the plow control 28 and the cable 61b are separated and reconnected to a 3-way or T-connector (not shown). A connector 128 from the interface controller 124 is connected to the third input of the T-connector; and in a manner similar to that described earlier, upon the connector 128 being connected to the T-connector, communications are established between the interface controller 124 and the plow switch controller 49 via the communications bus 89. The user is then able to use the switches 125 to set a security code into the plow switch controller 49. With the plow 22 mounted on the vehicle, the security code is transmitted to, and stored in, the plow controller 54. Thereafter, the connector 128 and the T-connector are removed, and the connectors 126a, 126b are reconnected. The user repeats the process for each vehicle that is to have a security code. Thereafter, upon the security code feature being enabled by the user, the plow switch controller 54 will not operate the solenoids 90 that control the plow hydraulics if the security code being transmitted by the plow switch controller 49 does not match the security code stored in the plow controller 54.

Another feature of the above-described control system is the ability to automatically detect a particular type of accessory that is mounted on the vehicle 20, for example, a straight blade plow, a V-blade plow or other plows. Further, each of those plows has a different plow control that must be installed by the user upon the plow being mounted on the vehicle. With such known systems, it is the responsibility of the user to properly install a plow control that matches the plow being mounted on the vehicle. Thus, it would be a significant advantage to be able to automatically detect the type of plow that is mounted on the vehicle and automatically reprogram the plow control 28, so that the functions of the switches 87 match the requirements of the mounted plow. Multiple function switches on plow controls is known; and one such embodiment is described in U.S. Pat. No. 6,253,470 for "Hydraulic and Electrical Control Systems for Use with Vehicle Accessory Units", the entirety of which is hereby incorporated herein by reference.

Referring to FIG. 2A, there are numerous solenoids 90 on the plow 22 that are operated by the plow controller 54, and those solenoids 90 are operably connectable to different hydraulic components (not shown) on the plow in a known manner. A straight blade plow is relatively simple to control, and therefore, only uses a few solenoids to control its operation. In contrast, the V-blade plow can be operated to orient the V-blade in different configurations depending on the plowing application. Thus, the control of a V-blade plow is substantially more complicated, and more solenoids must be used. Further, there is at least one solenoid 90a that is always used with a V-blade plow and is never used with a straight blade plow. Thus, each plow has a pattern of solenoids that are used when that plow is attached to the vehicle, and the CPU 74 of the plow switch controller 49 stores a configuration of solenoids associated with each of the plows to be attached to the vehicle, for example, in the case of a V-blade plow, the solenoid configuration would identify solenoid 90a.

When a plow 22 is mounted on the vehicle 20 and the connectors 94a, 94b are connected, communications are automatically initiated over the communications bus 89 between the plow controller 54 and the plow switch controller 49 as previously described with respect to FIGS. 3, 4, and 6A. Thereafter, at 412 of FIG. 5, the plow controller 54 scans various inputs including the solenoid current sensors 130 and transfers the states of respective inputs to the plow switch controller 49. As described at step 612 of FIG. 6A, the plow switch controller 49 receives and stores the various signals from the plow controller 54. The CPU 74 of the plow switch controller 49 then reads signal states representing the configuration of solenoids received from the plow controller 54 and compares them with the stored configurations of solenoids associated with the different plows. If a match is found, for example, if the plow switch controller CPU 74 detects the presence of solenoid 90a, the plow switch controller 49 then automatically programs the switches 87 of the plow control 28 to operate a V-blade plow. However, if the plow switch controller 49 determines that a different plow is attached, it automatically programs the plow control switches 87 to operate that different plow. Therefore, the automatic plow blade detection eliminates the requirement that the user manually program the plow switch controller 49 when a plow blade is attached.

Figure 6B:
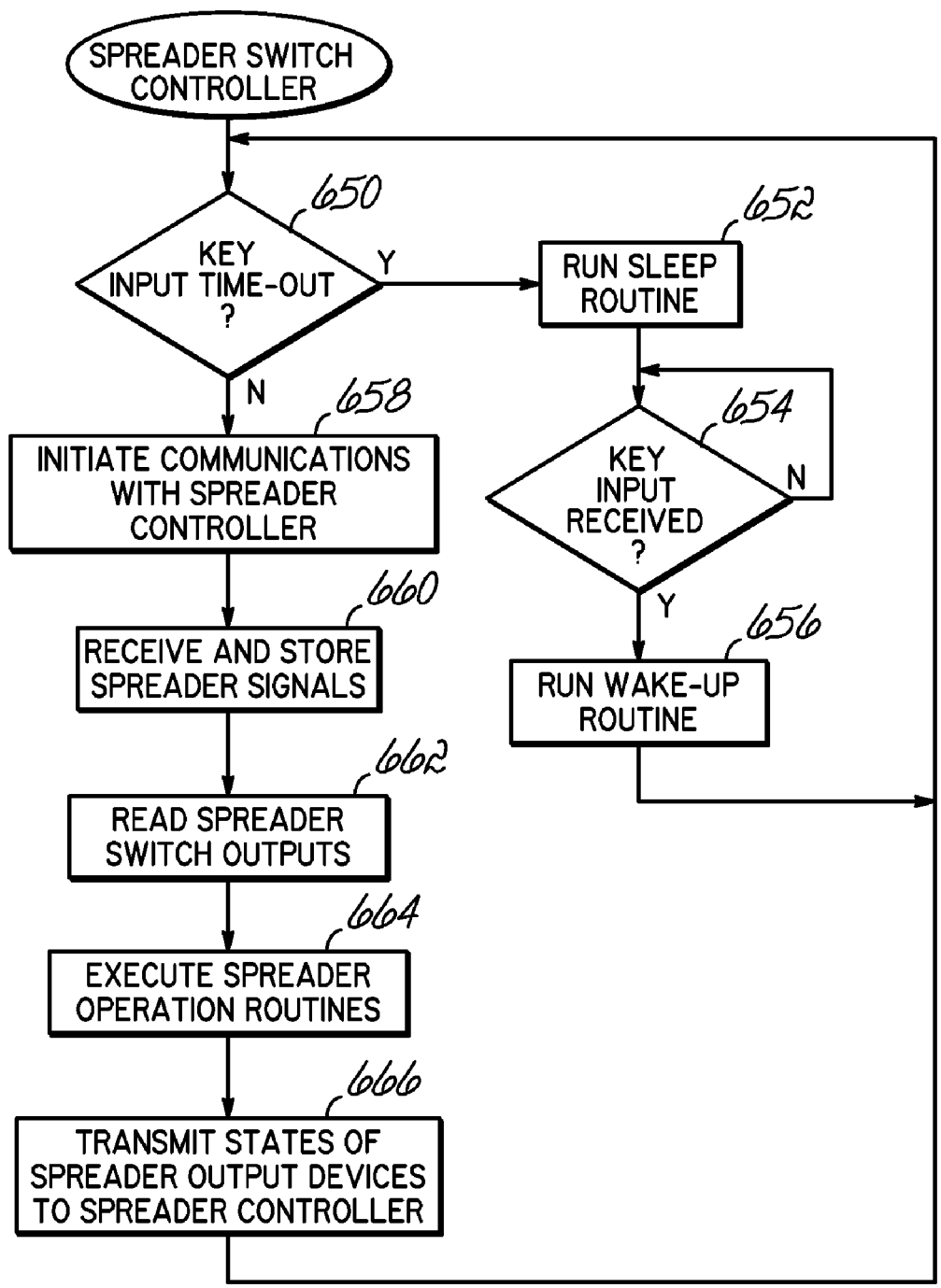
FIG. 6B is a flowchart illustrating an operation of a material spreader switch controller within the communications system of FIG. 1.

The spreader switch controller 55 and spreader controller 62 operate in a manner similar to that described with respect to the plow switch controller 49 and plow controller 54. Referring to FIG. 6B, the CPU 74 within the plow switch controller 55 executes, at 652, a sleep routine in response to detecting, at 650, an absence of an operation of the spreader control switches 56. After detecting the presence of an input from one of the switches 56, the CPU 74 executes a wake up routine, at 656, and proceeds, at 658, to initiate communications with the spreader controller 62.

Figure 7:
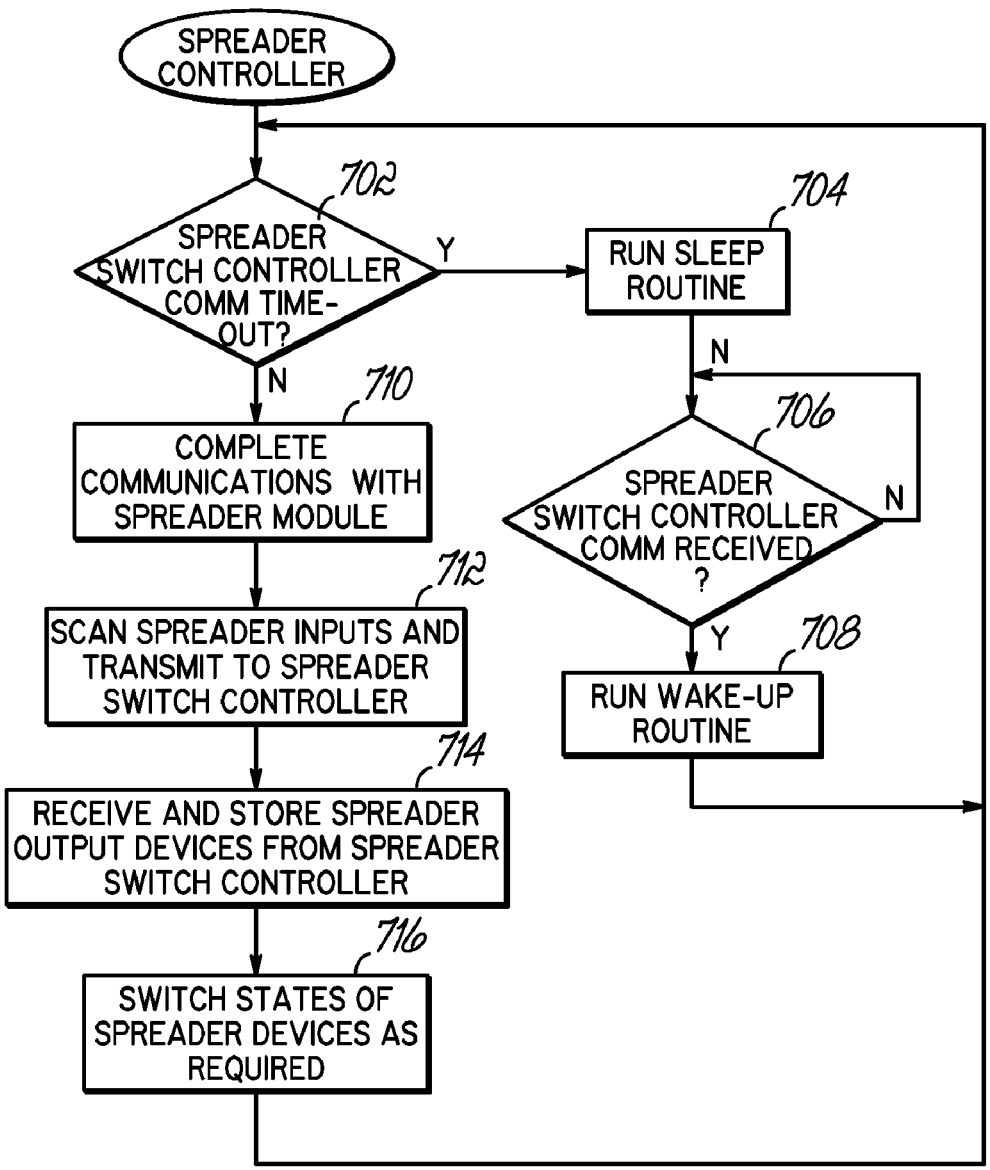
FIG. 7 is a flowchart illustrating an operation of a material spreader controller within the communications system of FIG. 1.

Referring to FIG. 7, the CPU 74 within the spreader controller 62 executes a sleep routine, at 704, in response to detecting, at 702, an absence of communications from the spreader switch controller 55 for a period of time. Upon detecting a subsequent spreader controller communication, at 706, a wake up subroutine is executed at 708. Thereafter, the CPU 74 within the spreader switch controller 55 completes the communications protocol with the spreader controller at 710. Thereafter, the CPU 74 within the spreader controller 62 scans the outputs of the input devices 77.

Referring to FIG. 6B, the CPU 74 within the spreader switch controller 55 receives and stores, at 660, error signal states, if any, the outputs from the input devices 77 and other signals associated with the spreader 24. Within the spreader switch controller 55, the CPU 74 also receives, at 662, the outputs of the inputs to the interface 72 which are determined by the user operating the spreader control switches 56. Thereafter, the CPU 74 of the spreader switch controller 55 executes, at 664, one or more spreader operation routines to determine the desired states of the spreader output devices that conform to the user commands and existing conditions on the spreader as determined by the input devices 77. The CPU 74 of the spreader switch controller 55 then proceeds, at 666, to transmit the desired states of the spreader output devices to the spreader controller 62 over the communications bus 88. During the execution of the spreader operation routines, at 664, the spreader control CPU also determines that output devices, for example, sensory perceptible indicators such as LEDs 83, associated with the spreader control 32 should be turned on or turned off. The operation of the LEDs 83 normally results from either the user operating the spreader control switches 56 or the spreader controller 62 transmitting an error signal to the spreader switch controller 55. In either event, within the spreader switch controller 55, the CPU 74 activates the driver circuits 82 to turn on or turn off the LEDs 83. The CPU 74 of the spreader switch controller 55 then continuously iterates the operation of FIG. 6B.

Referring to FIG. 7, the CPU 74 of the spreader controller 62 receives and stores, at 714, the states of the spreader output devices, and, at 716, the CPU 74 of the spreader controller 62 switches the states of the driver circuits 82 for the spreader devices, thereby operating the spreader 24 in accordance with the user operating the switches 56 on the spreader control 32.

The vehicle mounted accessory system described herein uses a distributed multi-controller system comprised of CPU-based controllers 49, 54, 55, 62 electrically interconnected with respective dedicated communications buses 88, 89 that transmit signals therebetween. The distributed multi-controller system has the advantages of being less expensive, reliable and particularly useful for accessory vehicle attachments which require a logical switching of accessory functions. With the distributed multi-controller system described herein, plows can be attached and reliably operated with minimal effort. A further advantage is provided in that communications between the plow operating devices and the plow control can be made secure, so that the plow operating devices are operated by only one plow control. Such a limitation has the advantage of deterring theft of the plow.

The distributed multi-controller system described herein has a further feature of being able to automatically detect the presence and operating state of a DRL system on the vehicle. Further, if a DRL system is detected to be operating, the plow headlights are automatically switched to a DRL operating mode in which they are illuminated at a reduced intensity. With such a feature, the full utility of the vehicle lights is automatically maintained when the plow is attached. The automatic DRL detection and operation has the advantage of improving the performance of the plow without complicating the plow installation.

The distributed multi-controller system described herein has a still further capability of providing secure communications between the controllers so that only specific devices can be operated by a particular vehicle. Thus, the capability of operating a plow with an unauthorized control system is virtually eliminated, thereby substantially reducing the ability of someone to steal an unattended and accessible plow.

The distributed multi-controller system has a yet further capability of being able to automatically detect a specific type of accessory, for example, a type of plow, mounted on the vehicle, and then automatically reprogram the plow control switches to operate that specific plow. This feature eliminates the need to provide multiple plow controls for the different types of plows; and further, this feature eliminates the requirement that the user correctly install a plow control that matches the type of plow being mounted on the vehicle. This capability provides significant savings and convenience in the use of the plow system.

The control system described herein has another feature that enhances the operation of a plow. When switches 87 on the plow control 28 are activated by a user to command an operation of the plow 22 in a manner as described herein, that command is transferred to the plow controller 54 via the plow switch controller 49. The plow controller 54 then activates driver circuits 80 to turn on the pump motor 57 via relay 59 and switch one of the solenoids 90 that is effective to port hydraulic oil from the pump motor 57 to a hydraulic actuator that causes the plow to move as commanded. However, when a stop command is generated by the user and transmitted to the plow controller 49, the plow controller modifies a normal stop operation of the plow. Normally, the pump motor 57 is shut off simultaneously with the switching of the one of the solenoids 90, thereby shutting off the pump motor 57 and terminating hydraulic oil flow to the hydraulic actuator controlling the plow motion. Such an abrupt stop of the system is noisy and is hard on the components of the hydraulic system; and therefore, the control system of the present invention provides an alternative method of shutting off the hydraulics. In response to the stop command, the pump motor is immediately turned off, however, the switching of one or more of the solenoids 90 is delayed slightly, for example, about 0.5 seconds. That delay permits oil pumped by the motor in the process of shutting off to flow to the hydraulic actuator. That process dissipates that oil by permitting a small movement of the hydraulic actuator and plow. At the end of the delay period, the one or more of the solenoids 90 is switched, thereby hydraulically disconnecting the hydraulic actuator from the pump motor 57. Thus, the plow is brought to a smooth and soft stop in response to a stop command instead of the hard stop resulting from the normal operation. Alternatively, an input device, such as a plow load transducer, can be used to terminate the operation of the pump motor 57.

While the present invention has been illustrated by a description of various preferred embodiments and while these embodiments have been described in detail, it is not intended to restrict or in any way limit the scope of the appended claims to such detail. Additional advantages and modifications within the spirit and scope of the invention will readily appear to those skilled in the art. For example, as will be appreciated, the use of distributed CPU-based controllers 49, 50, 54, 55, 62 permits a high degree of flexibility in terms of which controllers are utilized for a specific function. Further, in the description with respect to FIG. 4 relating to DRL detection, a voltage range of 20%-85% is described. As will be appreciated, the detection of such voltages is dependent on voltage levels used by manufacturers to achieve a DRL mode; and the voltage levels may vary from car to car depending on the characteristics of the light being used to provide the DRL. Generally, however, the detection will be detecting a voltage less than battery voltage.

In the described embodiment, a secure communications link is described between the plow switch controller 49 and the plow controller 54. As will be appreciated, in other embodiments, the same technology can be used to provide one or more secure communications links between any of the controllers.

In the described embodiment, a solenoid current sensor 130 associated with the plow controller 54 is used to detect the type of plow mounted on the vehicle 20. As will be appreciated, in other embodiments, a spreader solenoid current sensor can be used in association with spreader controller 62 to automatically detect what type of spreader is mounted on the vehicle, for example, a hopper spreader or a tailgate spreader. Further, the state of the output signal from the spreader solenoid current sensor is transmitted to the spreader switch controller 55 that is then operative to automatically program the spreader control switches 56 to operate the specific type of spreader being used. As will further be appreciated, the same technology can be used to detect a wide range of accessories that may be mounted on the vehicle.

In the described embodiment, the spreader switch controller 55 is in electrical communications with the spreader controller 62 but not with any of the plow controllers 49, 54. As will be appreciated, in an alternative embodiment, the communications bus 88 may be connected to the communications bus 89 via an optional connection 116. In that embodiment, any of the controllers 49, 54, 55 and 62 are capable of electrical communications with any of the other controllers.

Not only can the routing of communications between the controllers be modified, but the execution of various programs can be transferred from one controller to another. For example, the execution of plow operation routines 616, of FIG. 6A, that is executed by the CPU 74 within the plow switch controller 49, may alternatively be executed by the CPU 74 of the plow controller 54. Similarly, the execution of spreader operation routines, at 664 of FIG. 6B, that is currently executed in the CPU 74 of the spreader switch controller 55, may alternately be executed in the CPU 74 of the spreader controller 62. Thus, the utilization of distributed controllers that are in electrical communications over a communications bus provides enormous flexibility in the control of accessories that are attached to the vehicle.

Referring to FIG. 2B, while LEDs 83 are shown as the sensory perceptible indicators, other visual, audible or other indicators can be used. Referring to FIG. 2B, it should be noted that the switches 46, 47 and 108 shown as part of the OEM vehicle wiring are only an example of such wiring. As will be appreciated, there are many different configurations of lighting switches and wiring, and the invention claimed herein is not limited to the vehicle wiring shown and described. Similarly, there are many different configurations of the vehicle lights 26, and the invention claimed herein is not limited to the vehicle lights shown and described.

Therefore, the invention in its broadest aspects is not limited to the specific detail shown and described. Consequently, departures may be made from the details described herein without departing from the spirit and scope of the claims which follow.

What is claimed is:

1. An apparatus for controlling an accessory having a light other than an accessory headlight and being attachable to a vehicle having a vehicle light operable in a DRL mode, the apparatus comprising:
a controller adapted to be mounted on the vehicle, the controller illuminating the light other than the accessory headlight in response to detecting a supply voltage operable to illuminate the vehicle light in a DRL mode.

2. An apparatus for controlling a plow having a pair of turn signal lights and being attachable to a vehicle having a vehicle light operable in a DRL mode, the apparatus comprising:
a controller adapted to be mounted on the vehicle, the controller illuminating the pair of turn signal lights on the plow in response to detecting a supply voltage operable to illuminate the vehicle light in a DRL mode.

3. A method of operating a plow light on a plow attachable to a vehicle having a vehicle light, the method comprising:
detecting a supply voltage operable to illuminate the vehicle light;
determining the supply voltage is operable to illuminate the vehicle light in a DRL mode; and
automatically operating the plow light in a DRL mode in response to determining the supply voltage is operable to illuminate the vehicle light in a DRL mode.

4. The method of claim 3 wherein the step of automatically operating the plow light comprises illuminating a pair of turn signal lights on the plow determining the supply voltage is operable to illuminate the vehicle light in a DRL mode.

5. A method of operating a plow light on a plow attachable to a vehicle having a vehicle light and a high beam headlight, the high beam headlight operable in a DRL mode, the method comprising:
detecting a first supply voltage operable to illuminate the vehicle light;
monitoring a second supply voltage supplied to the high beam headlight;
determining the first supply voltage is operable to illuminate the vehicle light in a DRL mode;
identifying a vehicle DRL mode in response to the second supply voltage applied to the high beam headlight being less than a battery voltage; and
automatically operating the plow light in a DRL mode in response to determining the first supply voltage is operable to illuminate the vehicle light in a DRL mode and in response to identifying the vehicle DRL mode.

6. A method of operating a plow light on a plow attachable to a vehicle having a vehicle light and a low beam headlight, the low beam headlight operable in a DRL mode, the method comprising:
detecting a first supply voltage operable to illuminate the vehicle light;

monitoring a second supply voltage applied to the low beam headlight;

determining the first supply voltage is operable to illuminate the vehicle light in a DRL mode;

identifying a vehicle DRL mode in response to the second supply voltage applied to the low beam headlight being less than a battery wattage automatically operating the plow light in a DRL mode in response to determining the first supply voltage is operable to illuminate the vehicle light in a DRL mode and in response to identifying the vehicle DRL mode.

7. A method of operating a plow light on a plow attachable to a vehicle having a park light and a high beam headlight operable in a DRL mode, the method comprising:

monitoring a first supply voltage applied to the park light;

monitoring a second supply voltage applied to the high beam headlight;

identifying a vehicle DRL mode in response to detecting that no first supply voltage is applied to the park light, and in response to simultaneously detecting that the second supply voltage applied to the high beam headlight is about 85% of a battery voltage; and automatically operating the plow light in a DRL mode in response to identifying the vehicle DRL mode.

8. A method of operating a plow light on a plow attachable to a vehicle having a park light and a low beam headlight operable in a DRL mode, the method comprising:

monitoring a first supply voltage applied to the park light;

monitoring a second supply voltage applied to the low beam headlight;

identifying a vehicle DRL mode in response to detecting that no first supply voltage is applied to the park light, and in response to simultaneously detecting that the second supply voltage applied to the low beam headlight is about 85% of a battery voltage; and automatically operating the plow light in a DRL mode in response to identifying the vehicle DRL mode.

9. A method of providing a DRL mode on a plow having a light, the plow being attachable to a vehicle having a plurality of lights, the method comprising:

supplying a voltage to one of the plurality of lights to illuminate the one of the plurality of lights in a vehicle DRL mode;

monitoring voltages supplied to the plurality of lights on the vehicle;

identifying the one of the plurality of lights being illuminated in the vehicle DRL mode in response to monitoring the voltages supplied to the plurality of lights on the vehicle; and illuminating the light on the plow in a plow DRL mode in response to identifying the vehicle DRL mode.

10. An apparatus for detecting a presence of an accessory mounted on a vehicle, the accessory having an electrically operable device unique to the accessory, the apparatus comprising:

a first controller adapted to be mounted on the vehicle; and a second controller adapted to be mounted with the accessory and electrically connectable to the first controller upon the accessory being mounted on the vehicle, the second controller being electrically connected to the electrically operable device for sensing electrical continuity with the electrically operable device and then communicating to the first controller a presence of the electrically operable device unique to the accessory.

11. The apparatus of claim 10 wherein the first controller automatically programs itself to operate the accessory in response detecting the presence of the electrically operable device unique to the accessory.

12. An apparatus for detecting a presence of one of a plurality of accessories mounted on a vehicle, each of the plurality of accessories using a unique configuration of one or more electrically operable devices, the apparatus comprising:

a first controller adapted to be mounted on the vehicle; and a second controller adapted to be mounted with one of the plurality of accessories and adapted to be connected to a respective unique configuration of one or more electrically operable devices, the second controller being electrically connectable to the first controller upon the one of the plurality of accessories being mounted on the vehicle, and the second controller being electrically connected to the respective unique configuration of the one or more electrically operable devices for sensing electrical continuity with the one or more electrically operable devices, the second controller communicating the presence of the respective unique configuration of the one or more electrically operable devices to the first controller.

13. The apparatus of claim 12 wherein the first controller automatically programs itself to operate the one of the plurality of accessories in response detecting the presence of the respective unique configuration of the one or more electrically operable devices from the first controller.

14. The apparatus of claim 12 wherein the plurality of accessories is a plurality of plows.

15. The apparatus of claim 12 wherein the plurality of accessories is a plurality of spreaders.

16. A method for detecting a presence of one of a plurality of accessories mounted on a vehicle, each of the plurality of accessories using a unique configuration of one or more electrically operable devices, the method comprising:

mounting the one of the plurality of accessories on the vehicle;

electrically connecting a first controller mounted on the vehicle with a second controller mounted with the one of the plurality of accessories;

sensing with the second controller electrical continuity with a respective unique configuration of one or more electrically operable devices;

communicating from the second controller to the first controller a presence of the respective unique configuration of one or more electrically operable devices on the one of the plurality of accessories; and automatically programming the first controller to operate the one of the plurality of accessories in response to the first controller detecting the presence of the respective unique configuration of one or more electrically operable devices.

17. The method of claim 16 wherein the one of the plurality of accessories is a V-blade plow and the unique configuration of one or more electrically operable devices is a first solenoid, the method further comprising:

sensing with the second controller electrical continuity with the first solenoid;

communicating from the second controller to the first controller a presence of the first solenoid; and automatically programming the first controller to operate the V-blade plow in response to the first controller detecting the presence of the first solenoid.

18. The method of claim 17 wherein the one of the plurality of accessories is a straight blade plow and the unique configuration of one or more electrically operable devices is an absence of the first solenoid, the method further comprising:

sensing with the second controller an absence of electrical continuity with the first solenoid;

communicating from the second controller to the first controller an absence of the first solenoid; and automatically programming the first controller to operate the straight blade plow in response to the first controller detecting the absence of the first solenoid.

19. An apparatus for securing communications between a vehicle and an accessory mountable on the vehicle, the accessory requiring an electrically operable device for its operation, the apparatus comprising:

a first controller adapted to be mounted on the vehicle;

a user-operable interface controller electrically connectable to the first controller and being operable to provide a security code to the first controller; and a second controller adapted to be mounted with the accessory and being electrically connectable to the first controller upon the accessory being mounted on the vehicle, the second controller being operatively connected to the electrically operable device only in response to the second controller receiving the security code from the first controller.

20. The apparatus of claim 19 wherein the accessory is a plow and the electrically operable device is a solenoid.

21. A method of securing communications between a vehicle and an accessory mountable on the vehicle, the accessory requiring an electrically operable device for its operation, the method comprising:

storing a first security code in a first controller mounted on the vehicle;

transmitting the first security code from the first controller to a second controller mounted with the accessory and being electrically connectable to the first controller upon the accessory being mounted on the vehicle;

storing the first security code in the second controller;

operating the electrically operable device with the second controller in response to the first controller subsequently transmitting the first security code to the second controller; and disabling operation of the electrically operable device with the second controller in response to a first controller subsequently transmitting a second security code to the second controller that does not match the first security code.

22. The method of claim 21 further comprising providing the first security code with a user-operable interface controller connectable to the first controller.

23. The method of claim 21 further comprising:

electrically connecting the interface controller to the first controller prior to providing the first security code; and electrically disconnecting the interface controller from the first controller after storing the first security code in the first controller.

24. The method of claim 21 wherein the accessory is a plow and the electrically operable device is a solenoid.

25. An apparatus for securing communications between a vehicle and an accessory being mountable on a vehicle, the accessory requiring an electrically operable device for its operation, the apparatus comprising:

a user-operable switch adapted to be mounted on the vehicle remote from the accessory, the switch providing a command signal enabling operation of a security system;

a first controller adapted to be mounted on the vehicle and electrically connected to the switch, the first controller automatically producing and storing a first security code in response to receiving the command signal;

a second controller adapted to be mounted on the accessory and electrically connected to the electrically operable device;

first and second communications links electrically connected to the first and second controllers; respectively;

a first connector electrically connected to the first dedicated communications bus;

a second connector electrically connected to the second communications bus, the second connector being connectable to the first connector upon the accessory being mounted on the vehicle, thereby connecting the first and second dedicated communications buses to form a dedicated communications bus; and the first controller providing the first security code to the second controller via the dedicated communications bus and the second controller being operatively connected to the electrically operable device only in response to the second controller receiving the first security code from the first controller.

26. The apparatus of claim 25 wherein the second controller disables operation of the electrically operable device in response to the first controller subsequently transmitting a second security code to the second controller that does not match the first security code.

27. The apparatus of claim 25 wherein the accessory is a plow and the electrically operable device is a solenoid.

28. A method of securing communications between a vehicle and an accessory being mountable on a vehicle, the accessory requiring an electrically operable device for its operation, the method comprising:

enabling a security system with user-operated switches on a first controller mounted on the vehicle;

automatically providing a first security code with the first controller;

storing the first security code in the first controller;

transmitting the first security code to a second controller mounted with the accessory and being electrically connectable to the first controller upon the accessory being mounted on the vehicle;

storing the first security code in the second controller;

operating the electrically operable device with the second controller in response to the first controller subsequently transmitting the first security code to the second controller; and disabling operation of the electrically operable device with the second controller in response to the first controller subsequently transmitting a second security code to the second controller that does not match the first security code.

29. The method of claim 28 further comprising transmitting the first security code to the second controller over a dedicated communications bus.

30. The method of claim 28 wherein the accessory is a plow and the electrically operable device is a solenoid.

* * * * *

UNITED STATES PATENT AND TRADEMARK OFFICE
CERTIFICATE OF CORRECTION

| | | |
|---|---|---|
| PATENT NO. | : 7,737,576 B2 | Page 1 of 1 |
| APPLICATION NO. | : 12/173570 | |
| DATED | : June 15, 2010 | |
| INVENTOR(S) | : Edwin A. Wayne and Clarence J. Rand | |

It is certified that error appears in the above-identified patent and that said Letters Patent is hereby corrected as shown below:

Column 1, line 66 reads "or future vehicle electrical devises that are powered by, or"; line 66 should read --or future vehicle electrical devices that are powered by, or--.

Column 10, line 45 reads "blade plow. Thus, each plow has a pattern of solenoids that are"; line 45 should read --blade plow. Thus, each plow has a pattern of solenoids that is--.

Claim 4, column 14, line 42 reads "signal lights on the plow determining the supply voltage is"; line 42 should read --signal lights on the plow in response to determining the supply voltage is--.

Claim 6, column 15, line 7 reads "less than a battery wattage"; line 7 should read --less than a battery voltage;--.

Claim 11, column 16, line 1 reads "response detecting the presence of the electrically operable"; line 1 should read --response to detecting the presence of the electrically operable--.

Claim 13, column 16, line 24 reads "rality of accessories in response detecting the presence of the"; line 24 should read --rality of accessories in response to detecting the presence of the--.

Claim 25, column 18, line 9 reads "nected to the first and second controllers; respectively;"; line 9 should read --nected to the first and second controllers, respectively;--.

Signed and Sealed this
Tenth Day of May, 2011

David J. Kappos
*Director of the United States Patent and Trademark Office*